(12) United States Patent
Ueda et al.

(10) Patent No.: US 11,325,785 B2
(45) Date of Patent: May 10, 2022

(54) ARTICLE CONVEYING FACILITY

(71) Applicant: DAIFUKU CO., LTD., Osaka (JP)

(72) Inventors: Yuichi Ueda, Shiga (JP); Osamu Matsui, Shiga (JP); Hiroyuki Koide, Shiga (JP); Atsushi Ishikura, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/143,620

(22) Filed: Jan. 7, 2021

(65) Prior Publication Data
US 2021/0206576 A1 Jul. 8, 2021

(30) Foreign Application Priority Data

Jan. 8, 2020 (JP) .............................. JP2020-001109

(51) Int. Cl.
*B65G 17/12* (2006.01)
*B65G 43/00* (2006.01)
(52) U.S. Cl.
CPC ............. *B65G 17/12* (2013.01); *B65G 43/00* (2013.01)
(58) Field of Classification Search
CPC ................................ B65G 17/12; B65G 43/00
USPC ....... 198/794, 464.1, 465.1, 502.3, 507, 797
See application file for complete search history.

(56) References Cited

U.S. PATENT DOCUMENTS

| | | | | |
|---|---|---|---|---|
| 6,196,377 B1 * | 3/2001 | Brown | .................. | B65G 17/12 |
| | | | | 198/409 |
| 6,899,217 B1 * | 5/2005 | Fortenbery | .......... | B65G 47/962 |
| | | | | 198/370.04 |
| 8,140,202 B2 * | 3/2012 | Dibble | .................. | B61B 13/127 |
| | | | | 104/53 |
| 10,160,606 B2 | 12/2018 | Erceg | | |

FOREIGN PATENT DOCUMENTS

| | | | | |
|---|---|---|---|---|
| FR | 2999165 A3 * | 6/2014 | ............. | B65G 17/22 |
| FR | 2999164 A1 | 3/2019 | | |
| JP | 2018-122985 A | 8/2018 | | |

OTHER PUBLICATIONS

European Search Report dated Jun. 7, 2021 in corresponding European Patent Appl. No. 20217774.7.

* cited by examiner

*Primary Examiner* — Gene O Crawford
*Assistant Examiner* — Lester Rushin, III
(74) *Attorney, Agent, or Firm* — Kusner & Jaffe

(57) ABSTRACT

An article conveying facility in which an article is conveyed by a conveyance carriage travelling on a pair of left and right rails provided along a conveyance path. The article conveying facility includes a carriage driving apparatus that drives the conveyance carriage by utilizing a frictional force generated by contact with the conveyance carriage, and sensors that detect floating of the conveyance carriage with respect to the rails. The conveyance carriage includes a fin that contacts the carriage driving apparatus. The fin is provided so as to extend along the travelling direction of the convey- (Continued)

ance carriage, at a lower position than the position of an upper surface of the rails. The sensors detect floating of the conveyance carriage with respect to the rails by detecting the fin.

8 Claims, 5 Drawing Sheets

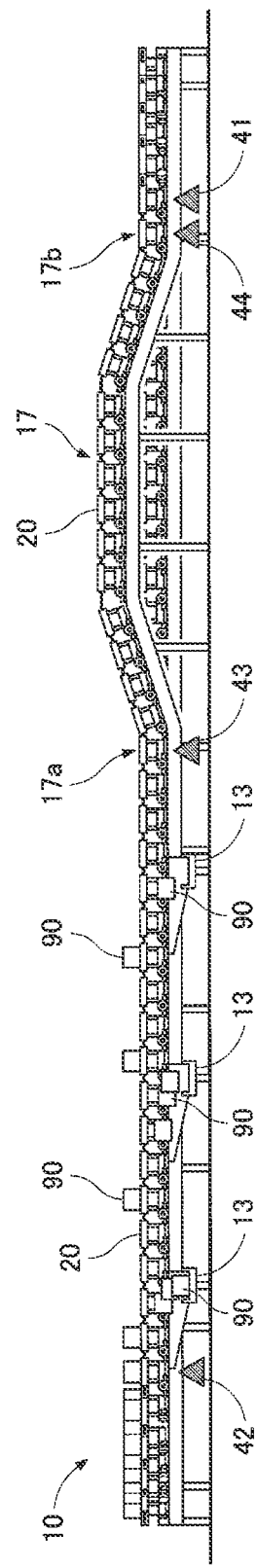

ARTICLE CONVEYING FACILITY

FIELD OF THE INVENTION

The present invention relates to article conveying facility in which a conveyance carriage which travels on a pair of left and right rails provided along a conveyance path conveys an article.

BACKGROUND OF THE INVENTION

Article conveying facility as described in Japanese Patent Laid-Open No. 2018-122985 has already been proposed as article conveying facility in which a conveyance carriage that travels on a pair of left and right rails provided along a conveyance path conveys an article.

The article conveying facility disclosed in Japanese Patent Laid-Open No. 2018-122985 performs sorting of articles by causing a plurality of conveyance carriages that are connected endlessly to each other to travel along a loop-shaped conveyance path. The conveyance carriage that travels along the conveyance path receives, onto a belt conveyer, an article from a loading conveyor that is provided laterally to the conveyance path. When the conveyance carriage that travels along the conveyance path conveys the received article as far as a predetermined position, the conveyance carriage delivers the conveyed article to a delivery conveyor that is provided laterally to the conveyance path. A curved portion and an inclined portion are formed in the conveyance path. By the conveyance carriage travelling along the conveyance path in which a curved portion and an inclined portion are formed, the article is conveyed from the loading conveyor to the delivery conveyor.

However, in the conventional article conveying facility as disclosed in Japanese Patent Laid-Open No. 2018-122985, when a conveyance carriage travels through a curved portion of the conveyance path or travels through an inclined portion of the conveyance path, there is a risk that the conveyance carriage will float up from the rails and derail due to a centrifugal force applied to the conveyance carriage or due to vertical motion of the conveyance carriage. Therefore, it is necessary to detect floating of the conveyance carriage when the conveyance carriage is travelling and prevent derailment of the conveyance carriage from occurring.

SUMMARY OF THE INVENTION

It is an object of the present invention to provide an article conveying facility that is capable of reliably detecting floating of a conveyance carriage with respect to rails that is the cause of derailment of the conveyance carriage.

A problem to be solved by the present invention is as described above. Next, means for solving the problem will be described.

That is, article conveying facility of the present invention is article conveying facility that conveys an article by means of a conveyance carriage travelling on a pair of left and right rails provided along a conveyance path, including: a driving apparatus that drives the conveyance carriage by utilizing a frictional force generated by contact with the conveyance carriage; and a floating detection apparatus that detects floating of the conveyance carriage with respect to the rails; wherein: the conveyance carriage includes a contact portion that contacts the driving apparatus; the contact portion is provided in an extending manner along a travelling direction of the conveyance carriage at a lower position than an upper surface position of the rails; and the floating detection apparatus detects floating of the conveyance carriage with respect to the rails by detecting the contact portion.

In the above configuration, the floating detection apparatus detects floating of the conveyance carriage with respect to the rails by detecting a portion that is at a lower position than the upper surface position of the rails, that is a portion at which the conveyance carriage contacts the driving apparatus.

Another aspect of the article conveying facility of the present invention is in accordance with the above article conveying facility, wherein: the contact portion is formed by a plate that protrudes from the conveyance carriage in a downward direction relative to the upper surface position of the rails, and a side face of the plate is provided so as to extend continuously along the travelling direction of the conveyance carriage; the driving apparatus drives the conveyance carriage by contacting the side face of the plate; and the floating detection apparatus detects floating of the conveyance carriage with respect to the rails by detecting the plate.

In the above configuration, the conveyance carriage is driven by the driving apparatus contacting a side face of a plate that protrudes from the conveyance carriage in the downward direction relative to the upper surface position of the rails. Floating of the conveyance carriage is detected by the floating detection apparatus detecting the side face of the plate.

Another aspect of the article conveying facility of the present invention is in accordance with the above article conveying facility, wherein: the conveyance carriage includes a pair of left and right side rollers that are provided at a position facing a side face of the rails that is a lower position than the upper surface position of the rails, and that regulate movement in a transverse direction of the conveyance carriage; and with respect to the floating detection apparatus, a detection range from a lower edge of the contact portion is within a range of a distance in a vertical direction that corresponds to a height from the upper surface position of the rails to a position at which the side rollers are arranged.

In the above configuration, the floating detection apparatus detects a predetermined range from the lower edge of the contact portion of the conveyance carriage. The predetermined range is the range of a distance in the vertical direction that corresponds to the height from the upper surface position of the rails to the position at which the side rollers are arranged.

Another aspect of the article conveying facility of the present invention is in accordance with the above article conveying facility, wherein:

the floating detection apparatus is arranged at least at any one position among:

in the conveyance path, an entrance section of a conveyance path at which the rails are formed in a curved shape;

in the conveyance path, an exit section of a conveyance path at which the rails are formed in a curved shape;

in the conveyance path, an entrance section of a conveyance path at which the rails incline upward; and in the conveyance path, an exit section of a conveyance path at which the rails incline downward.

In the above configuration, the floating detection apparatus detects the contact portion of the conveyance carriage at least at any one position among: in the conveyance path, an entrance section of a conveyance path at which the rails are formed in a curved shape; in the conveyance path, an exit section of a conveyance path at which the rails are formed in a curved shape; in the conveyance path, an entrance section of a conveyance path at which the rails incline upward; and in the conveyance path, an exit section of a conveyance path at which the rails incline downward.

According to the article conveying facility of the present invention, because a contact portion of a conveyance carriage which a driving apparatus contacts in order to drive the conveyance carriage is used for detecting floating of the conveyance carriage with respect to the rails, floating of the conveyance carriage can be reliably detected by utilizing the already existing structure of the conveyance carriage.

BRIEF DESCRIPTION OF THE DRAWINGS

FIG. 1B is a schematic front view of the article conveying facility according to the present invention;

DETAILED DESCRIPTION OF THE INVENTION

Hereunder, article conveying facility 10 of the present invention is described. Note that, the present invention is not limited to the article conveying facility 10 described hereunder.

Figure 1A:
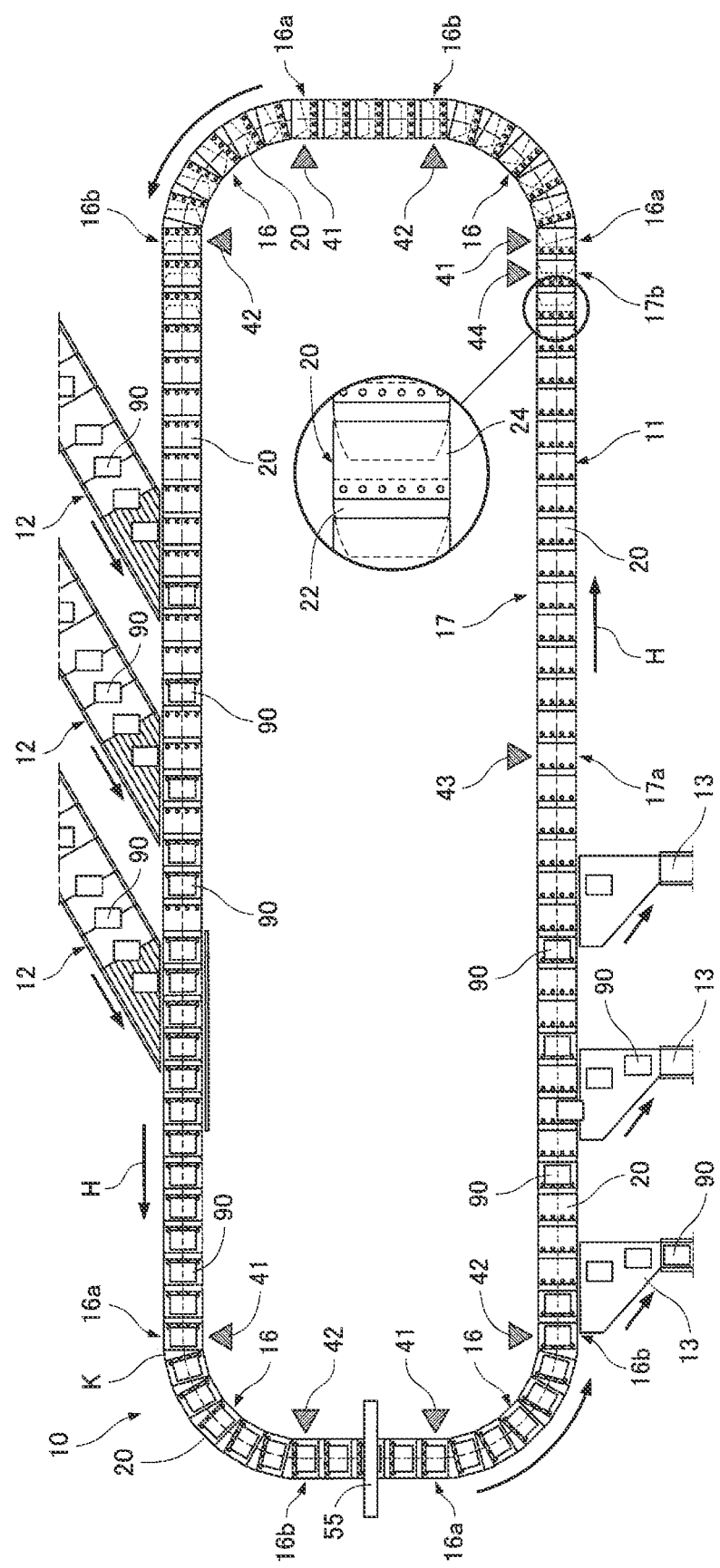
FIG. 1A is a schematic plan view of an article conveying facility according to the present invention.

As illustrated in FIG. 1A and FIG. 1B, in the article conveying facility 10, a loop-shaped conveyance path K for conveying articles 90 is formed. Note that, a conveyance path for conveying the articles 90 is not limited to the loop-shaped conveyance path K. The article conveying facility 10 is mainly constituted by: a main conveyor apparatus 11 which conveys the articles 90 along the conveyance path K; a plurality of induction conveyors 12 which introduce the articles 90 onto the conveyance path K of the main conveyor apparatus 11; a plurality of chutes 13 which receive the articles 90 that are delivered from the conveyance path K of the main conveyor apparatus 11; and an article detection apparatus 55 which detects a mounting location of the respective articles 90 on a belt conveyer 23.

Figure 3:
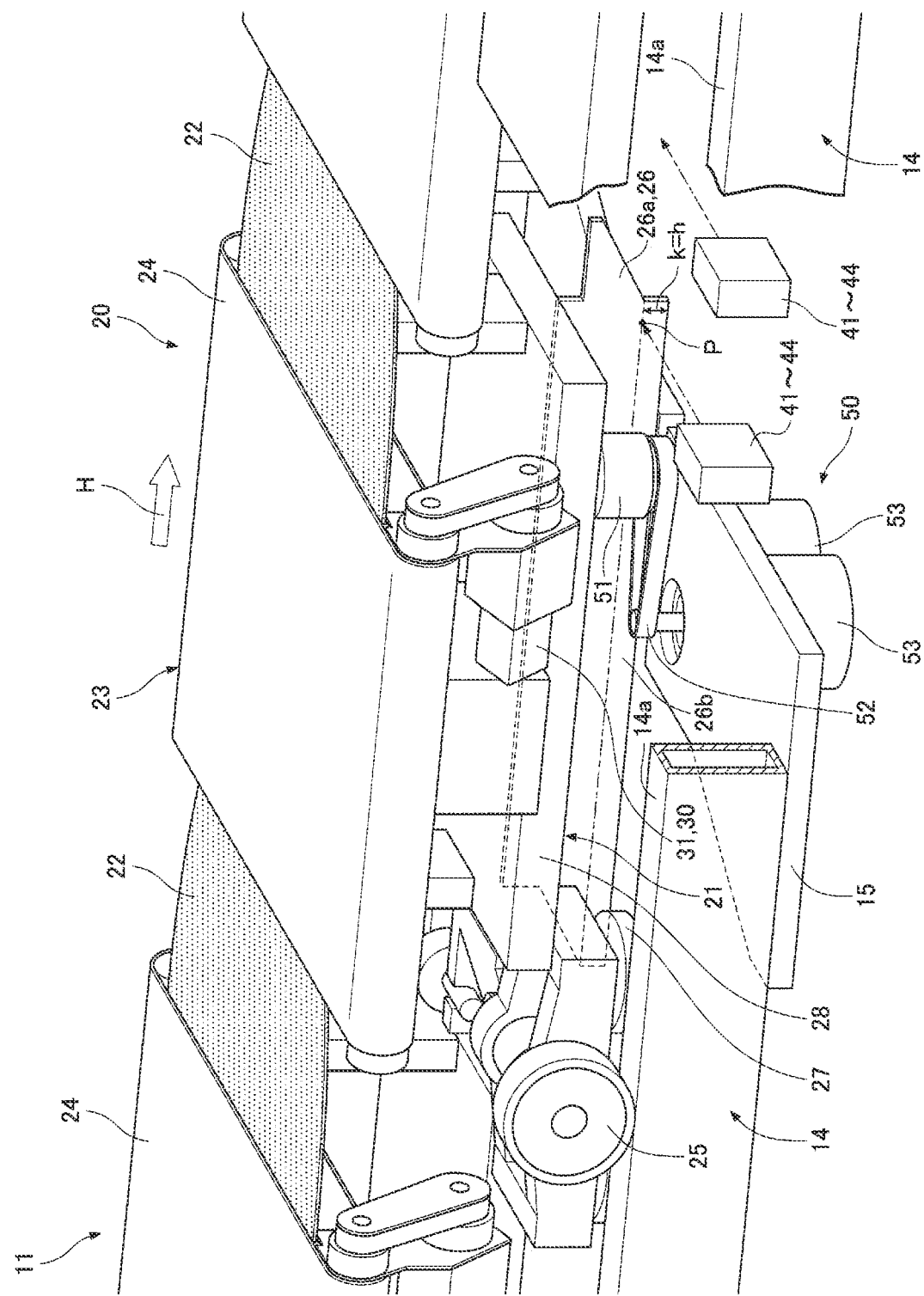
FIG. 3 is a perspective view of a conveyance carriage that travels in the article conveying facility according to the present invention.
Figure 4:
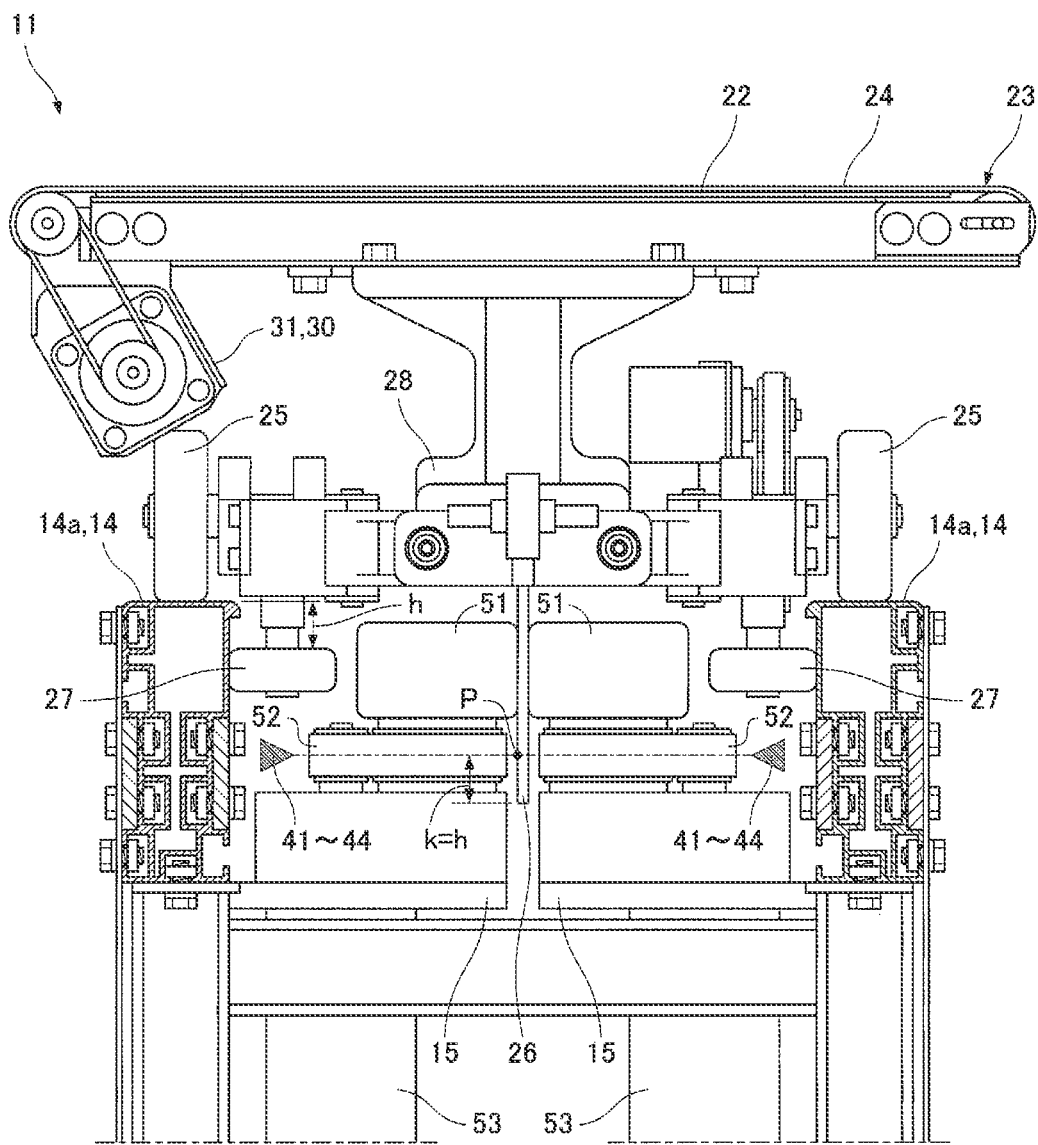
FIG. 4 is a side view of the conveyance carriage that travels in the article conveying facility according to the present invention.

In the article conveying facility 10, from a predetermined induction conveyor 12, the articles 90 are introduced to conveyance carriages 20 that travel along rails (see FIG. 3) of the main conveyor apparatus 11. The articles 90 that were introduced onto the conveyance carriages 20 are conveyed along the conveyance path K. The articles 90 conveyed by the conveyance carriages 20 are, for example, delivered to the chutes 13 which are allocated to respective shops, and thereby sorted for each shop. Prior to being delivered onto the chutes 13, the articles 90 conveyed by the conveyance carriages 20 are adjusted so that the mounting location of the article 90 on the belt conveyer 23 becomes the center position of the belt conveyer 23, based on detection by the article detection apparatus 55.

Figure 2:
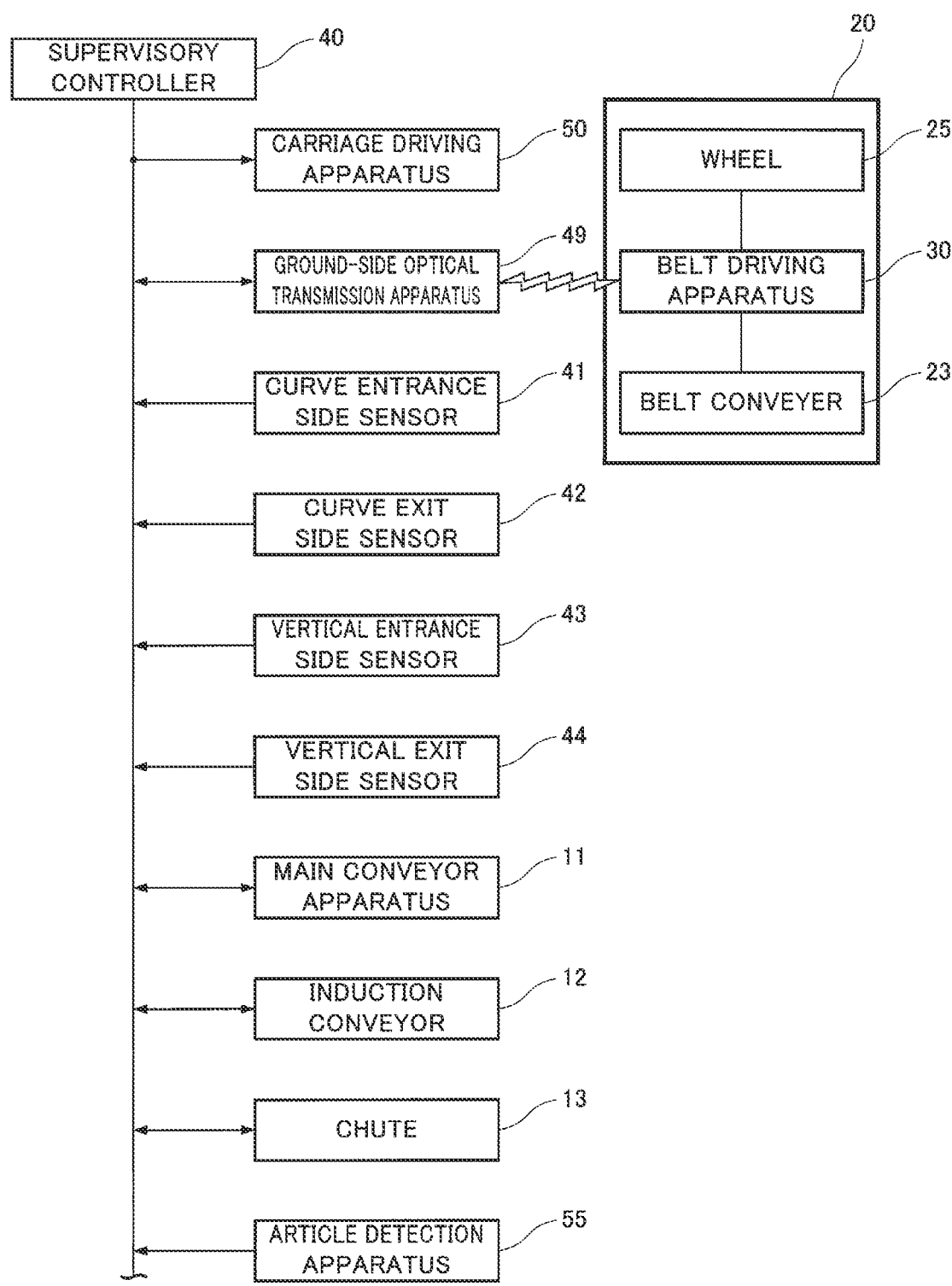
FIG. 2 is a block diagram illustrating a control configuration of the article conveying facility according to the present invention.

As illustrated in FIG. 2, the respective apparatuses (the main conveyor apparatus 11, the induction conveyors 12, the chutes 13, and the article detection apparatus 55) of the article conveying facility 10 are connected to a supervisory controller 40 that controls the entire article conveying facility 10, and are controlled by the supervisory controller 40.

As illustrated in FIG. 1A, FIG. 1B, FIG. 3 and FIG. 4, in the main conveyor apparatus 11, the articles 90 are conveyed along the conveyance path K by the conveyance carriages 20 on which the articles 90 are mounted travelling on the rails 14. As illustrated in FIG. 1B, in the main conveyor apparatus 11, in the conveyance path K on the downstream side in the conveying direction from the positions at which the chutes 13 are arranged, a vertical section 17 is formed at which the conveying surface is formed in the upward direction relative to other positions on the conveyance path K. The vertical section 17 is constituted by a path at which the rails 14 incline upward from an entrance section 17a (portion on the upstream side in the conveying direction), a path at which the rails 14 are horizontally arranged, and a path at which the rails 14 incline downward toward an exit section 17b (portion on the downstream side in the conveying direction). As illustrated in FIG. 1A, in the main conveyor apparatus 11, curve sections 16 at which the rails 14 are formed in a curved shape are formed at predetermined positions (four places in FIG. 1A) of the conveyance path K.

The induction conveyor 12 introduces the articles 90 onto the belt conveyer 23 of the respective conveyance carriages 20 that travel along the conveyance path K. A plurality of (three in FIG. 1A) the induction conveyors 12 are arranged side by side so as to be along the conveyance path K.

The chute 13 receives the articles 90 delivered from the conveyance carriages 20, and conveys the received articles 90 to other facility on the downstream side (for example, shipping facility) or directly to a vehicle (for example, a truck) or the like. A plurality (three in FIG. 1A) of the chutes 13 are arranged side by side so as to be along the conveyance path K.

The article detection apparatus 55 is constituted by plurality of sensors which are provided above the main conveyor apparatus 11. The article detection apparatus 55 detects the mounting location of the article 90 that is mounted on the belt conveyer 23, and sends the detection result to the supervisory controller 40 (see FIG. 2).

Next, the conveyance carriage 20 that travels on the conveyance path K will be described.

As illustrated in FIG. 1A, FIG. 1B, FIG. 3 and FIG. 4, the conveyance carriage 20 receives the article 90 that was introduced from a predetermined induction conveyor 12. The conveyance carriage 20 conveys the received article 90 along the conveyance path K, and delivers the article 90 to a predetermined chute 13. Each conveyance carriage 20 is connected to the conveyance carriages 20 that are adjacent thereto on the conveyance path K, and the conveyance carriage 20 travels on the rails 14 in a state in which the relevant conveyance carriage 20 is connected to the adjacent conveyance carriages 20.

The conveyance carriage 20 travels by driving of a carriage driving apparatus 50 (one example of "driving apparatus"). The carriage driving apparatus 50 is a friction drive-type driving apparatus. The carriage driving apparatus 50 includes pinch rollers 51 that contact both side faces 26a of a fin 26 of the conveyance carriage 20, a timing belt 52 that rotates the pinch rollers 51, and a drive motor 53 that drives the pinch rollers 51. The carriage driving apparatus 50 is a driving apparatus that utilizes a frictional force generated by contact of the pair of the pinch rollers 51 to transmit motive power to the conveyance carriage 20. The carriage driving apparatus 50 causes the rotating pair of pinch rollers 51 to contact the two side faces 26a of the fin of the conveyance carriage 20. The carriage driving apparatus 50 causes the conveyance carriage 20 to travel by thrusting forward the fin 26 by means of a frictional force generated by contact of the pair of pinch rollers 51. A plurality of the carriage driving apparatuses 50 are provided at predetermined positions of the conveyance path K, which are positions that are between the pair of rails 14 and are lower than the position of an upper surface 14a of the respective rails 14. The carriage driving apparatus 50 is supported by a support frame 15 that is fixed to the rails 14. As illustrated in FIG. 2, the carriage driving apparatus 50 is connected to the supervisory controller 40, and is controlled by the supervisory controller 40.

As illustrated in FIG. 1A, FIG. 1B, FIG. 3 and FIG. 4, the conveyance carriage 20 mainly includes a main body 21 that travels on the rails 14, a cover 22 that covers a gap between the conveyance carriage 20 and an adjacent conveyance carriage 20, the belt conveyer 23 which supports the article 90 that is mounted thereon, and a belt driving apparatus 30 for driving the belt conveyer 23.

The main body 21 mainly includes wheels 25 for travelling on the rails 14, the fin 26 (one example of "contact portion") that contacts the pinch rollers 51 of the carriage driving apparatus 50, a pair of left and right side rollers 27 that regulate movement in the transverse direction of the conveyance carriage 20; and a frame 28 that supports each constituent member of the conveyance carriage 20.

The fin 26 is a plate with a long shape that is provided in an extending manner along the front-rear direction of the conveyance carriage 20 (travelling direction H of the conveyance carriage 20). The fin 26 is attached to the frame 28 at a lower part of the main body 21. The fin 26 is formed in a manner in which the fin 26 protrudes from the main body (the conveyance carriage 20) in the downward direction relative to the position of the upper surface 14a of the rails 14. The two side faces 26a of the fin 26 are arranged so as to face the pair of rails 14. The two side faces 26a of the fin 26 are provided so as to extend continuously along the front-rear direction of the conveyance carriage 20 (travelling direction H of the conveyance carriage 20). The pinch rollers 51 of the carriage driving apparatus 50 contact the two side faces 26a of the fin 26 to support the fin 26. The fin 26 is thrust forward in the travelling direction H of the conveyance carriage 20 by a frictional force generated by contact with the pinch rollers 51.

The cover 22 is constituted by a plate-like member that is shaped so as to cover a gap between the conveyance carriages 20 that are adjacent to each other in the conveyance path K. The cover 22 is fixed to a rear side end of the conveyance carriage 20 (end on the rear side with respect to the travelling direction H of the conveyance carriage 20).

The belt conveyer 23 is provided at an upper portion of the main body 21. By means of a belt 24 being driven by the belt driving apparatus 30, the article 90 that is mounted on the belt 24 is conveyed by the belt conveyer 23 in a direction that is horizontally perpendicular to the travelling direction H of the conveyance carriage 20. The belt 24 of the belt conveyer 23 is driven by the belt driving apparatus 30 when the conveyance carriage 20 arrives at a predetermined induction conveyor 12, when the conveyance carriage 20 arrives at a predetermined chute 13, and when the position of the article 90 on the belt 24 deviates from an appropriate position during conveying of the article 90 by the conveyance carriage 20.

As illustrated in FIG. 2, electric power for driving the belt conveyer 23 is generated by rotation of the wheels 25, and the belt driving apparatus 30 drives the belt conveyer 23 by means of the generated electric power. The belt driving apparatus 30 performs driving of the belt conveyer 23 and generation of electric power for driving, based on an instruction signal from the supervisory controller 40 that is transmitted through a ground-side optical transmission apparatus 49 which is provided (independently from the conveyance carriage 20) on the ground side.

Travelling of the conveyance carriage 20 and operations of the belt conveyer 23 (the belt driving apparatus 30) are controlled by the supervisory controller 40 that is provided (independently from the conveyance carriage 20) on the ground side and that controls the entire article conveying facility 10. Note that, the conveyance carriage 20 is not limited to a component that is directly controlled by the supervisory controller 40 that controls the entire article conveying facility 10, and may be a component that is controlled by a lower-order controller than the supervisory controller 40.

As illustrated in FIG. 1A, FIG. 1B, FIG. 2 and FIG. 3, floating in the vertical direction of the conveyance carriage 20 with respect to the rails 14 is detected based on detection by a curve entrance side sensor 41 (one example of "floating detection apparatus"), a curve exit side sensor 42 (one example of "floating detection apparatus"), a vertical entrance side sensor 43 (one example of "floating detection apparatus"), and a vertical exit side sensor 44 (one example of "floating detection apparatus").

The sensors 41, 42, 43 and 44 are each constituted by, for example, a photoelectric sensor that includes an optical transmitter and an optical receiver. The sensors 41, 42, 43 and 44 are sensors in which two single axis sensors are arranged with a predetermined interval therebetween along the conveyance path K on one side of the conveyance path K. Here, the term "predetermined interval" refers to an interval that is wider than an interval between the fins 26 of two of the conveyance carriages 20 that are provided consecutively at positions to the front and rear relative to each other (an interval that is formed between the front end of the fin 26 of the conveyance carriage 20 on the upstream side in the conveying direction and the rear end of the fin 26 of the conveyance carriage 20 on the downstream side in the conveying direction). The sensors 41, 42, 43 and 44 are connected to the supervisory controller 40, and transmit detection signals to the supervisory controller 40. Based on detection signals transmitted from the sensors 41, 42, 43 and 44, the supervisory controller 40 detects floating in the vertical direction of the conveyance carriage 20 with respect to the rails 14.

The curve entrance side sensor 41 is provided at an entrance section 16a of each of the curve sections 16 of the main conveyor apparatus 11, and detects the conveyance carriages 20 passing through the entrance section 16a of the curve section 16. The supervisory controller 40 detects floating of the respective conveyance carriages 20 at the entrance section 16a of the curve section 16 based on a detection signal transmitted from the curve entrance side sensor 41.

The curve exit side sensor 42 is provided at an exit section 16b of each of the curve sections 16 of the main conveyor apparatus 11, and detects the conveyance carriages 20 passing through the exit section 16b of the curve section 16. The supervisory controller 40 detects floating of the respective conveyance carriages 20 at the exit section 16b of the curve section 16 based on a detection signal transmitted from the curve exit side sensor 42.

The vertical entrance side sensor 43 is provided at the entrance section 17a of the vertical section 17 of the main conveyor apparatus 11, and detects the conveyance carriages 20 passing through the entrance section 17a of the vertical section 17. The supervisory controller 40 detects floating of the respective conveyance carriages 20 at the entrance section 17a of the vertical section 17 based on a detection signal transmitted from the vertical entrance side sensor 43.

The vertical exit side sensor 44 is provided at the exit section 17b of the vertical section 17 of the main conveyor apparatus 11, and detects the conveyance carriages 20 passing through the exit section 17b of the vertical section 17. The supervisory controller 40 detects floating of the respective conveyance carriages 20 at the exit section 17b of the vertical section 17 based on a detection signal transmitted from the vertical exit side sensor 44.

In the article conveying facility 10, floating of the conveyance carriages 20 with respect to the rails 14 is liable to occur at the entrance section 16a and the exit section 16b of each of the curve sections 16, and at the entrance section 17a and the exit section 17b of the vertical section 17. Therefore, by arranging the sensors 41, 42, 43 and 44 at the entrance section 16a and the exit section 16b of each of the curve sections 16 and at the entrance section 17a and the exit section 17b of the vertical section 17, floating of the conveyance carriages 20 with respect to the rails 14 can be reliably detected.

When the sensors 41, 42, 43 and 44 are detecting for floating of the conveyance carriages 20, the sensors 41, 42, 43 and 44 detect the fin 26 of the relevant conveyance carriage 20. Specifically, the sensors 41, 42, 43 and 44 detect the presence or absence of the fin 26 by detecting a side face 26a on one of the left and the right sides of the fin 26 within a range 26b of a predetermined distance k in the upward direction from the lower edge of the fin 26, along the longitudinal direction of the fin 26 (front-rear direction of the conveyance carriage 20). Here, the term "predetermined distance k" refers to a distance in the vertical direction that corresponds to a height h from the position of the upper surface 14a of the rail 14 to the position at which the side roller 27 of the conveyance carriage 20 is arranged, and in a case where the conveyance carriage 20 moved vertically with respect to the rail 14, refers to a distance that corresponds to a height such that the side roller 27 does not pass over the upper surface 14a of the rail 14. That is, the sensors 41, 42, 43 and 44 detect the side face 26a on one of the left side and right side of the fin 26 within a range in which floating of the conveyance carriage 20 is permissible.

The sensors 41, 42, 43 and 44 are respectively arranged at a position at which a position P that is separated by the predetermined distance k from the lower edge of the fin 26 with respect to the conveyance carriage 20 that is in a stopped state on the rails 14 is detectable along the longitudinal direction of the side face 26a on one of the left side and right side of the fin 26.

In this case, because the fin 26 is attached to the conveyance carriage 20 at a position that is lower than the position of the upper surface 14a of each of the rails 14, the sensors 41, 42, 43 and 44 can detect floating of the conveyance carriage 20 by performing detection within the range 26b of the predetermined distance k in the upward direction from the lower edge of the fin 26 along the longitudinal direction of the fin 26 (front-rear direction of the conveyance carriage 20). That is, in a case where the conveyance carriage 20 travels without floating, the fin 26 does not float upward and pass beyond the predetermined distance k, and hence at least one of the single axis sensors among the two single axis sensors constituting the respective sensors 41, 42, 43 and 44 can detect the presence of the fin 26. On the other hand, in a case where the conveyance carriage 20 travels in a state in which the conveyance carriage 20 has floated by an amount greater than the predetermined distance k, since the fin 26 will also be in a state in which the fin 26 has floated by an amount greater than the predetermined distance k, neither of the two single axis sensors constituting the sensors 41, 42, 43 and 44 can detect the presence of the fin 26. Therefore, in a case where the sensors 41, 42, 43 and 44 detected the fin 26, it can be determined that the conveyance carriage 20 is travelling without floating, and in a case where the sensors 41, 42, 43 and 44 do not detect the fin 26, it can be determined that the conveyance carriage 20 is travelling in a floating state. Such a determination is made by the supervisory controller 40 based on the presence or absence of a detection signal from the sensors 41, 42, 43 and 44. That is, in a case where the sensors 41, 42, 43 and 44 transmit a detection signal, the supervisory controller 40 determines that the conveyance carriage 20 is travelling without floating, and in a case where the sensors 41, 42, 43 and 44 do not transmit a detection signal, the supervisory controller 40 determines that the conveyance carriage 20 is travelling in a floating state.

With respect to two conveyance carriages 20 that are provided consecutively at positions to the front and rear relative to each other on the conveyance path K, between the front end of the fin 26 of the conveyance carriage 20 on the upstream side in the conveying direction and the rear end of the fin 26 of the conveyance carriage 20 on the downstream side in the conveying direction there is a portion at which a fin 26 is not present (connecting portion between the conveyance carriages 20). Therefore, with respect to the sensors 41, 42, 43 and 44, at the portion at which the fin 26 is not present, one of the two single axis sensors constituting the respective sensors 41, 42, 43 and 44 cannot detect the fin 26 and therefore does not transmit a detection signal to the supervisory controller 40. Consequently, if only the existence or non-existence of transmission of a detection signal from the sensors 41, 42, 43 and 44 is taken as the criterion for determining floating, in a case where there is no detection signal from one of the single axis sensors among the two single axis sensors constituting the sensors 41, 42, and 44 even though the conveyance carriages 20 are travelling without floating, the supervisory controller 40 will determine that the conveyance carriages 20 are travelling in a floating state. Therefore, in a case where there is transmission of a detection signal from at least one of the single axis sensors among the two single axis sensors constituting the sensors 41, 42, 43 and 44, the supervisory controller 40 determines that the conveyance carriages 20 are travelling without floating, and in a case where neither of the two single axis sensors constituting the sensors 41, 42, and 44 transmit a detection signal, the supervisory controller 40 determines that the conveyance carriages 20 are travelling in a floating state.

Further, in some cases the conveyance carriages 20 travel while repeatedly changing (while repeating vertical motion) between a state in which the conveyance carriages 20 float upward from the rails 14 and a state in which the conveyance carriages 20 do not float upward from the rails 14. In such a situation also, there are cases where at least one of the single axis sensors among the two single axis sensors constituting the sensors 41, 42, 43 and 44 transmits a detection signal to the supervisory controller 40, and even though the conveyance carriages 20 are intermittently travelling in a floating state (while repeating vertical motion), the supervisory controller 40 determines that the conveyance carriages 20 are travelling without floating due to the fact that there is a detection signal from the sensors 41, 42, 43 and 44. Therefore, in a case where a detection signal from one of the single axis sensors among the two single axis sensors constituting the respective sensors 41, 42, 43 and 44 is transmitted continuously for a certain time period, the supervisory controller 40 determines that the conveyance carriages 20 are travelling without floating. Here, the term "certain time period" refers to a time period that is required for one of the two single axis sensors constituting the respective sensors 41, 42, 43 and 44 to detect from the front end (end on the downstream side in the conveying direction) to the rear end (end on the upstream side in the conveying direction) of the fin 26 when the relevant conveyance carriage 20 is passing by, and is a time period that is set according to the length in the longitudinal direction of the fin 26, the conveying speed of the conveyance carriage 20, and the state of acceleration/deceleration of the conveyance carriage 20 and the like.

Thus, in a case where the conveyance carriage 20 is travelling without floating, "one" of the single axis sensors among the two single axis sensors constituting the respective sensors 41, 42, 43 and 44 transmits a detection signal to the supervisory controller 40 during a period in which the fin 26 of the conveyance carriage 20 passes through a position at which the sensors 41, 42, 43 and 44 are arranged, and does not transmit a detection signal to the supervisory controller 40 during a period in which the connecting portion (portion at which the fin 26 does not exist) between the conveyance carriages 20 passes through a position at which the sensors 41, 42, 43 and 44 are arranged. Note that, during a period in which the connecting portion between the conveyance carriages 20 passes through a position at which the sensors 41, 42, 43 and 44 are arranged, "the other" of the single axis sensors among the two single axis sensors constituting the respective sensors 41, 42, 43 and 44 transmits a detection signal to the supervisory controller 40. Thus, in a case where the conveyance carriage 20 is travelling without floating, the two single axis sensors constituting the respective sensors 41, 42, 43 and 44 detect the fin 26 of the conveyance carriage 20 repeatedly at a predetermined cycle that was set, and in a case where the conveyance carriage 20 is travelling in a floating state, the two single axis sensors constituting the respective sensors 41, 42, 43 and 44 detect the fin 26 of the conveyance carriage 20 at a timing that deviates from the cycle that was set.

As described above, according to the present embodiment, because the fin 26 of the conveyance carriage 20 which the carriage driving apparatus 50 contacts to cause the conveyance carriage 20 to drive is used for detecting floating of the conveyance carriage 20 with respect to the rails 14, it is not necessary to provide a new member in the conveyance carriage 20 in order to perform detection of floating of the conveyance carriage 20, and floating of the conveyance carriage 20 can be detected reliably utilizing the already existing structure of the conveyance carriage 20.

Note that, although in the present embodiment the conveyance carriage 20 that travels on the pair of left and right rails 14 provided along the conveyance path K is a conveyance carriage that includes the belt conveyer 23, the present invention is not limited thereto, and the conveyance carriage may include a tray on which the article 90 can be mounted, or a container or the like that is capable of housing the article 90.

Although in the present embodiment the article conveying facility 10 is facility that includes the main conveyor apparatus 11, the induction conveyor 12, the chute and the article detection apparatus 55, the present invention is not limited thereto, and the article conveying facility 10 may be of any kind as long as the article conveying facility 10 is facility on which a conveyance carriage that conveys an article travels.

Although in the present embodiment the respective sensors 41, 42, 43 and 44 are constituted by two single axis sensors, the present invention is not limited thereto, and the respective sensors 41, 42, 43 and 44 may be constituted by one single axis sensor. In this case, the supervisory controller 40 measures a transmission time period of a detection signal transmitted from the respective sensors 41, 42, 43 and 44, and detects floating of the conveyance carriage 20 depending on the measured transmission time period. Specifically, in a case where a detection signal is not transmitted from the sensors 41, 42, 43 and 44 even after a predetermined time period passes, the supervisory controller 40 determines that the conveyance carriages 20 are travelling in a floating state. Here, the term "predetermined time period" is a time period required for the connecting portion (space formed between the fins 26 of two conveyance carriages 20 provided consecutively at positions to the front and rear relative to each other, that is a space formed between the front end of the fin 26 of the conveyance carriage 20 on the upstream side in the conveying direction and the rear end of the fin 26 of the conveyance carriage 20 on the downstream side in the conveying direction) between the conveyance carriages 20 to pass through a position at which the respective sensors 41, 42, 43 and 44 are arranged, and is a time that is set according to the length in the longitudinal direction of the fin 26, the length of the connecting portion (space formed between the fins 26 of two conveyance carriages 20 provided consecutively at positions to the front and rear relative to each other, that is a space formed between the front end of the fin 26 of the conveyance carriage 20 on the upstream side in the conveying direction and the rear end of the fin 26 of the conveyance carriage 20 on the downstream side in the conveying direction) between the conveyance carriages 20, the conveying speed of the conveyance carriage 20, and the state of acceleration/deceleration of the conveyance carriage 20 and the like.

REFERENCE SIGNS LIST

10 Article conveying facility
14 Rail
14a Upper Surface of Rail
20 Conveyance Carriage
26 Fin (Contact Portion)
41 Curve Entrance Side Sensor (Floating Detection Apparatus)
42 Curve Exit Side Sensor (Floating Detection Apparatus)
43 Vertical Entrance Side Sensor (Floating Detection Apparatus)
44 Vertical Exit Side Sensor (Floating Detection Apparatus)
50 Carriage Driving Apparatus (Driving Apparatus)
90 Article
K Conveyance Path

What is claimed is:

1. An article conveying facility that conveys an article by means of a conveyance carriage travelling on a pair of left and right rails provided along a conveyance path, comprising:
   a driving apparatus that drives the conveyance carriage by utilizing a frictional force generated by contact with the conveyance carriage; and
   a floating detection apparatus that detects floating of the conveyance carriage with respect to the rails;

wherein:
the conveyance carriage comprises a contact portion that contacts the driving apparatus;
the contact portion is provided in an extending manner along a travelling direction of the conveyance carriage at a lower position than a position at which wheels of the conveyance carriage contact a surface of the rails; and
the floating detection apparatus detects floating of the conveyance carriage with respect to the rails by detecting the contact portion.

2. The article conveying facility according to claim 1, wherein:
the contact portion is formed by a plate that protrudes from the conveyance carriage in a downward direction relative to the position at which the wheels of the conveyance carrier contact the surface of the rails, and a side face of the plate is provided so as to extend continuously along the travelling direction of the conveyance carriage;
the driving apparatus drives the conveyance carriage by contacting the side face of the plate; and
the floating detection apparatus detects floating of the conveyance carriage with respect to the rails by detecting the plate.

3. The article conveying facility according to claim 1, wherein:
the conveyance carriage comprises a pair of left and right side rollers that are provided at a position facing a side face of the rails that is a lower position than the position at which the wheels of the conveyance carrier contact the surface of the rails, and that regulate movement in a transverse direction of the conveyance carriage; and
with respect to the floating detection apparatus, a detection range from a lower edge of the contact portion is within a range of a distance in a vertical direction that corresponds to a height from the position at which the wheels of the conveyance carrier contact the surface of the rails to a position at which the side rollers are arranged.

4. The article conveying facility according to claim 1, wherein:
the floating detection apparatus is arranged at least at any one position among:
in the conveyance path, an entrance section of a conveyance path at which the rails are formed in a curved shape;
in the conveyance path, an exit section of a conveyance path at which the rails are formed in a curved shape;
in the conveyance path, an entrance section of a conveyance path at which the rails incline upward; and
in the conveyance path, an exit section of a conveyance path at which the rails incline downward.

5. The article conveying facility according to claim 2, wherein:
the conveyance carriage comprises a pair of left and right side rollers that are provided at a position facing a side face of the rails that is a lower position than the position at which the wheels of the conveyance carrier contact the surface of the rails, and that regulate movement in a transverse direction of the conveyance carriage; and
with respect to the floating detection apparatus, a detection range from a lower edge of the contact portion is within a range of a distance in a vertical direction that corresponds to a height from the position at which the wheels of the conveyance carrier contact the surface of the rails to a position at which the side rollers are arranged.

6. The article conveying facility according to claim 5, wherein:
the floating detection apparatus is arranged at least at any one position among:
in the conveyance path, an entrance section of a conveyance path at which the rails are formed in a curved shape;
in the conveyance path, an exit section of a conveyance path at which the rails are formed in a curved shape;
in the conveyance path, an entrance section of a conveyance path at which the rails incline upward; and
in the conveyance path, an exit section of a conveyance path at which the rails incline downward.

7. The article conveying facility according to claim 2, wherein:
the floating detection apparatus is arranged at least at any one position among:
in the conveyance path, an entrance section of a conveyance path at which the rails are formed in a curved shape;
in the conveyance path, an exit section of a conveyance path at which the rails are formed in a curved shape;
in the conveyance path, an entrance section of a conveyance path at which the rails incline upward; and
in the conveyance path, an exit section of a conveyance path at which the rails incline downward.

8. The article conveying facility according to claim 3, wherein:
the floating detection apparatus is arranged at least at any one position among:
in the conveyance path, an entrance section of a conveyance path at which the rails are formed in a curved shape;
in the conveyance path, an exit section of a conveyance path at which the rails are formed in a curved shape;
in the conveyance path, an entrance section of a conveyance path at which the rails incline upward; and
in the conveyance path, an exit section of a conveyance path at which the rails incline downward.

* * * * *